United States Patent
Lee et al.

(10) Patent No.: US 7,419,099 B2
(45) Date of Patent: Sep. 2, 2008

(54) PORTABLE TERMINAL AND SWING HINGE MODULE THEREOF

(75) Inventors: Yang-Jic Lee, Seoul (KR); Jong-Seong Lee, Seoul (KR); Jae-Shik Kim, Seoul (KR); Hong-Bae Kim, Yongin-si (KR); Hyon-Myong Song, Swon-si (KR)

(73) Assignee: Samsung Electronics Co., Ltd. (KR)

( * ) Notice: Subject to any disclaimer, the term of this patent is extended or adjusted under 35 U.S.C. 154(b) by 178 days.

(21) Appl. No.: 10/946,744

(22) Filed: Sep. 22, 2004

(65) Prior Publication Data

US 2005/0082372 A1 Apr. 21, 2005

(30) Foreign Application Priority Data

Oct. 17, 2003 (KR) .................. 10-2003-0072459

(51) Int. Cl.
- *G06K 7/10* (2006.01)
- *G06K 7/00* (2006.01)
- *H04M 9/00* (2006.01)
- *H04M 1/00* (2006.01)

(52) U.S. Cl. ............. 235/472.01; 235/435; 379/433.12; 379/433.13; 455/575.4; 455/575.3

(58) Field of Classification Search .............. 455/550.1, 455/575.3, 575.4, 575.1; 379/433.12, 433.13; 235/472.01, 435

See application file for complete search history.

(56) References Cited

U.S. PATENT DOCUMENTS

| | | | | |
|---|---|---|---|---|
| 5,485,517 A * | 1/1996 | Gray | ................... | 379/433.13 |
| 5,730,342 A * | 3/1998 | Tien | ........................... | 224/271 |
| 6,148,480 A * | 11/2000 | Cooke | ........................ | 16/303 |
| 6,459,887 B2 * | 10/2002 | Okuda | ...................... | 455/90.1 |
| 6,549,789 B1 * | 4/2003 | Kfoury | .................... | 455/550.1 |
| 6,766,182 B2 * | 7/2004 | Janninck et al. | ........... | 455/575.3 |
| 6,850,784 B2 * | 2/2005 | SanGiovanni | ............ | 455/575.1 |
| 6,856,792 B2 * | 2/2005 | Harmon | .................... | 455/90.3 |
| 6,917,824 B2 * | 7/2005 | Kobayashi | ............... | 455/575.3 |
| 6,999,802 B2 * | 2/2006 | Kim | ........................ | 455/575.1 |
| 7,003,104 B2 * | 2/2006 | Lee | ....................... | 379/433.13 |
| 7,036,186 B2 * | 5/2006 | Jeong et al. | ................... | 16/303 |
| 7,050,764 B2 * | 5/2006 | Carlson | ..................... | 455/90.3 |
| 7,136,685 B2 * | 11/2006 | Chiang | .................... | 455/575.3 |
| 7,139,596 B2 * | 11/2006 | SanGiovanni | ............ | 455/575.1 |
| 7,146,197 B2 * | 12/2006 | Kang et al. | .............. | 455/575.1 |
| 7,151,911 B2 * | 12/2006 | Matsumoto | ................ | 455/90.2 |
| 7,158,816 B1 * | 1/2007 | Mizuta et al. | ............ | 455/575.3 |

(Continued)

FOREIGN PATENT DOCUMENTS

EP 1 353 488 10/2003

*Primary Examiner*—Daniel I Walsh
(74) *Attorney, Agent, or Firm*—The Farrell Law Firm, PC

(57) ABSTRACT

A portable terminal is disclosed having a first housing; a swing hinge module providing a rotation axis which extends perpendicularly to a top surface of the first housing; and a second housing coupled to the swing hinge module and adapted to be rotated about the rotation axis while facing the first housing. As the second housing is rotated about the rotation axis, the swing hinge module stops the rotation of the second housing at least once at a predetermined position. The second housing is rotated semi-automatically by means of the swing hinge module.

30 Claims, 13 Drawing Sheets

U.S. PATENT DOCUMENTS

| | | | |
|---|---|---|---|
| 7,162,030 B2* | 1/2007 | Bell et al. | 379/433.13 |
| 2002/0102946 A1* | 8/2002 | SanGiovanni | 455/90 |
| 2003/0114198 A1 | 6/2003 | Han | |
| 2003/0157957 A1* | 8/2003 | Wendorff et al. | 455/550 |
| 2003/0228847 A1* | 12/2003 | Matsumoto | 455/90.3 |
| 2004/0080468 A1* | 4/2004 | Wakefield | 345/55 |
| 2004/0097258 A1* | 5/2004 | Lee et al. | 455/550.1 |
| 2004/0110529 A1* | 6/2004 | Watanabe et al. | 455/550.1 |
| 2004/0132482 A1* | 7/2004 | Kang et al. | 455/550.1 |
| 2004/0185920 A1* | 9/2004 | Choi et al. | 455/575.1 |
| 2004/0192422 A1* | 9/2004 | Watanabe et al. | 455/575.3 |
| 2004/0198474 A1* | 10/2004 | Jung et al. | 455/575.1 |
| 2004/0203531 A1* | 10/2004 | Shimamura et al. | 455/90.3 |
| 2004/0203532 A1* | 10/2004 | Mizuta | 455/90.3 |
| 2004/0204015 A1* | 10/2004 | Harmon et al. | 455/550.1 |
| 2004/0209645 A1* | 10/2004 | Park et al. | 455/556.1 |
| 2004/0219957 A1* | 11/2004 | Nishijima et al. | 455/575.3 |
| 2004/0224729 A1* | 11/2004 | Watanabe et al. | 455/575.3 |
| 2004/0224730 A1* | 11/2004 | Sakai et al. | 455/575.3 |
| 2004/0224732 A1* | 11/2004 | Lee et al. | 455/575.3 |
| 2004/0248628 A1* | 12/2004 | Taninai | 455/575.3 |
| 2005/0054396 A1* | 3/2005 | Yang | 455/575.3 |
| 2005/0079897 A1* | 4/2005 | Nishijima et al. | 455/575.1 |
| 2005/0082372 A1* | 4/2005 | Lee et al. | 235/472.01 |
| 2005/0091795 A1* | 5/2005 | Jeong et al. | 16/303 |
| 2005/0107137 A1* | 5/2005 | Byun et al. | 455/575.1 |
| 2005/0107138 A1* | 5/2005 | SanGiovanni | 455/575.1 |
| 2005/0119023 A1* | 6/2005 | Sudo et al. | 455/550.1 |
| 2005/0119032 A1* | 6/2005 | Airas | 455/566 |
| 2005/0124395 A1* | 6/2005 | Bae et al. | 455/575.3 |
| 2005/0136970 A1* | 6/2005 | Kim | 455/550.1 |
| 2005/0137000 A1* | 6/2005 | Toh et al. | 455/575.4 |
| 2005/0137001 A1* | 6/2005 | Bell et al. | 455/575.4 |
| 2005/0148375 A1* | 7/2005 | DeLine | 455/575.3 |
| 2005/0159194 A1* | 7/2005 | Heintz et al. | 455/575.3 |
| 2005/0202856 A1* | 9/2005 | Park et al. | 455/575.1 |
| 2005/0221874 A1* | 10/2005 | Cho et al. | 455/575.4 |
| 2005/0250561 A1* | 11/2005 | Lee et al. | 455/575.3 |
| 2005/0272488 A1* | 12/2005 | Zou | 455/575.4 |
| 2005/0287953 A1* | 12/2005 | Ikeda et al. | 455/66.1 |
| 2006/0019726 A1* | 1/2006 | Park et al. | 455/575.1 |
| 2006/0019728 A1* | 1/2006 | Sakamoto et al. | 455/575.3 |
| 2006/0034450 A1* | 2/2006 | Chang | 379/433.12 |
| 2006/0035685 A1* | 2/2006 | Janninck et al. | 455/575.1 |
| 2006/0046783 A1* | 3/2006 | Bae | 455/558 |
| 2006/0058079 A1* | 3/2006 | Goto | 455/575.3 |
| 2006/0063570 A1* | 3/2006 | Nishimura | 455/575.3 |
| 2006/0079303 A1* | 4/2006 | Lee | 455/575.4 |
| 2006/0098813 A1* | 5/2006 | Takamori et al. | 379/433.13 |
| 2006/0121961 A1* | 6/2006 | Cho | 455/575.3 |
| 2006/0128440 A1* | 6/2006 | Murray et al. | 455/569.1 |
| 2006/0135199 A1* | 6/2006 | Richter et al. | 455/550.1 |
| 2006/0142073 A1* | 6/2006 | Gordecki | 455/575.4 |
| 2006/0148425 A1* | 7/2006 | Carlson | 455/90.3 |
| 2006/0154702 A1* | 7/2006 | Kang et al. | 455/575.3 |
| 2006/0154706 A1* | 7/2006 | Kim | 455/575.4 |
| 2006/0223596 A1* | 10/2006 | Hur | 455/575.4 |
| 2006/0246964 A1* | 11/2006 | Castaneda et al. | 455/575.3 |
| 2006/0293094 A1* | 12/2006 | Kilpi et al. | 455/575.3 |
| 2006/0293095 A1* | 12/2006 | Takagi | 455/575.3 |
| 2007/0026907 A1* | 2/2007 | Jeun | 455/575.1 |
| 2007/0082693 A1* | 4/2007 | Drucker et al. | 455/550.1 |
| 2008/0051162 A1* | 2/2008 | Kim et al. | 455/575.3 |
| 2008/0064452 A1* | 3/2008 | Kim et al. | 455/575.3 |

* cited by examiner

PORTABLE TERMINAL AND SWING HINGE MODULE THEREOF

PRIORITY

This application claims priority to an application entitled "A Portable Terminal And A Swing Hinge Module Thereof" filed with the Korean Intellectual Property Office on Oct. 17, 2003 and assigned Serial No. 2003-72459, the contents of which are hereby incorporated by reference.

BACKGROUND OF THE INVENTION

1. Field of the Invention

The present invention relates to portable terminals, and more particularly to portable terminals having first and second housings coupled in such a manner that they can be rotated while they face each other, as well as swing hinge modules to facilitate the rotation thereof.

2. Description of the Related Art

In general, "portable terminals" refer to apparatuses which a user can carry with him/her to perform wireless communication with a desired partner. According to their appearance, such portable terminals may be classified into bar-type terminals, flip-type terminals, and folder-type terminals. The bar-type terminal has a single housing shaped like a bar. The flip-type terminal has a flip or a cover which is pivotably mounted to a bar-shaped housing by a hinge unit. The folder-type terminal has a folder coupled to a bar-shaped housing by a hinge unit in such a manner that the folder can be rotated in order to be folded to or unfolded from the housing.

Further, the portable terminals may be classified into rotation-type terminals and sliding-type terminals according to ways of opening and closing the terminals. In the rotation-type terminals, two housings are coupled to each other in such a manner that one housing rotates to be opened or closed relative to the other. In the sliding-type terminals, two housings are coupled to each other in such a manner that one housing slides to be opened or closed relative to the other while they face each other. These variously classified portable terminals can be easily understood by those skilled in the art.

Meanwhile, conventional portable terminals, as mentioned above, necessarily comprise antenna units, data input units, data output units, and data transmission/reception units. The data input unit is generally a key pad which enables a user to input data through finger pressing operations, but a touch pad or a touch screen may also be used. The data output unit is generally an LCD or other screen display.

The key pad, which is used to input data, is composed a number of key arrays. The keys include numeric keys, character keys, send keys, end keys, function keys, and the like. Usually, fifteen to twenty keys are appropriately positioned on the top surface of a portable terminal and are exposed to a user so that he/she can input data through finger pressing operations as desired.

Recently, users' tastes in choosing terminals tend to be diversified and their desire for information is an increasing trend. However, conventional portable terminals are not satisfying such demands. Although new terminals are being developed according to new design concepts, practical means to implement them for commercial purposes is still insufficient.

SUMMARY OF THE INVENTION

Accordingly, the present invention has been made to solve the above-mentioned problems occurring in the prior art, and an object of the present invention is to provide a portable terminal capable of satisfying diversified taste and desire of users.

Another object of the present invention is provide a portable terminal having a novel swing hinge module to offer the user a rotatable terminal which is easy to use in a variety of configurations.

In order to accomplish these objects, there is provided a portable terminal including a first housing; a swing plate coupled to an area of the first housing and adapted to be rotated about a rotation axis extending perpendicularly to a top surface of the first housing; and a second housing coupled to the swing plate that can be rotated about a hinge axis, which extends perpendicularly to the rotation axis, the second housing being rotatable about the rotation axis together with the swing plate and, at the same time, rotatable about the hinge axis in a direction towards and away from the first housing.

In accordance with another aspect of the present invention, there is provided a portable terminal including a first housing extending along in a longitudinal direction; a swing hinge module having a protruding area formed on a top surface, the swing hinge module being positioned in an area of the first housing and providing a rotation axis which extends perpendicularly to a top surface of the first housing; a hinge module positioned in the protruding area of the swing hinge module and providing a hinge axis extending perpendicularly to the rotation axis; and a second housing coupled to the protruding area of the swing hinge module by means of the hinge module and rotatable in a direction towards and away from the first housing.

In accordance with still another aspect of the present invention, there is provided a swing hinge module of a portable terminal including a spring housing; at least one spring having one end supported on the spring housing; and a swing plate coupled to the spring housing and rotatable by elastic force of the spring while facing the spring housing, wherein the spring is provides rotational force which rotates the spring between an initial pre-rotation position and a predetermined position in accordance with the rotational angle of a swing plate.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Figure 1:
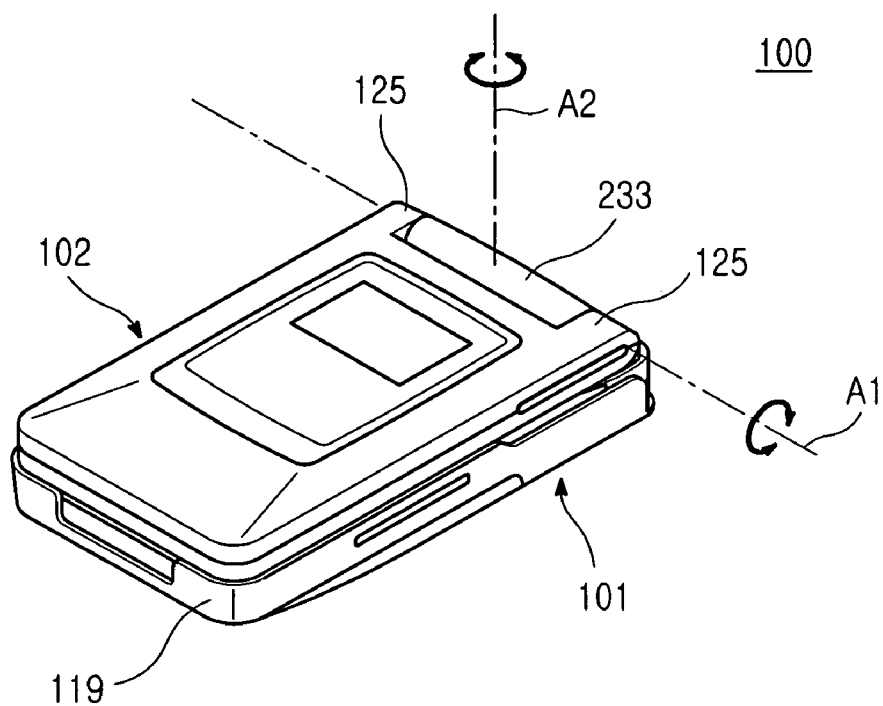
FIG. 1 is a perspective view showing a portable terminal according to a first embodiment of the present invention.
Figure 2:
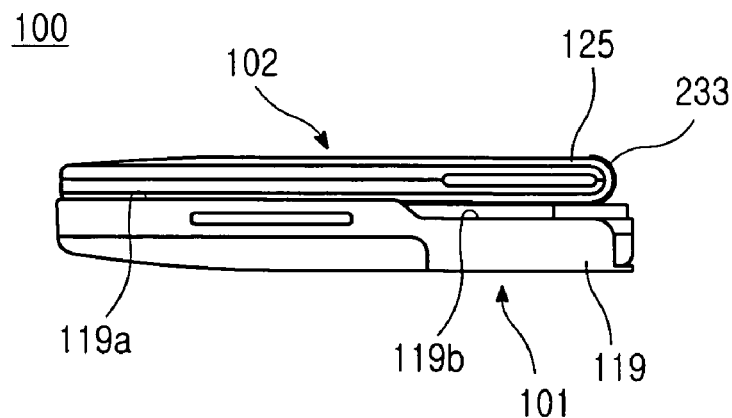
FIG. 2 is a side view of the portable terminal shown in FIG. 1.

Hereinafter, preferred embodiments of the present invention will be described with reference to the accompanying drawings. In the following description of the present invention, a detailed description of known functions and configurations incorporated herein will be omitted when it may make the subject matter of the present invention unclear.

As shown in FIGS. 1 to 6, a portable terminal 100 according to a first embodiment of the present invention comprises a first housing 101, a second housing 102, and a swing hinge module 200.

The first and second housings 101 and 102 are rotatably coupled to each other by means of the swing hinge module 200. The first housing 101 is provided with a key pad 111 on its top surface and the second housing 102 is provided with a display unit 121 on its bottom surface which faces the first housing 101. Although not shown in the drawings, it will be obvious to those skilled in the art that the portable terminal 100 may be provided with a transmitter unit and a receiver unit for voice communication. The transmitter unit and the receiver unit may be disposed adjacent to the key pad and the display unit, respectively.

The first housing 101 is enclosed in a cover 119, which is preferably made of a metallic material adapted to protect the lower edges, opposite sides, and bottom surface of the first housing 101. Preferably the cover 119 has an upper portion 119a adjacent to the key pad 111, protruding slightly higher than the top surface of the first housing 101 and another upper portion 119b adjacent to the upper region of the first housing 101, formed slightly lower than the top surface of the first housing 101. This provides a space for smooth rotation of the second housing 102.

The swing hinge module 200 is positioned in the upper region of the top surface of the first housing 101. The swing hinge module 200 provides a rotation axis A2 extending perpendicularly to the top surface of the first housing 101 and perpendicularly to a hinge axis A1, which is in a plane parallel to the top surface of the first housing 101.

Figure 3:
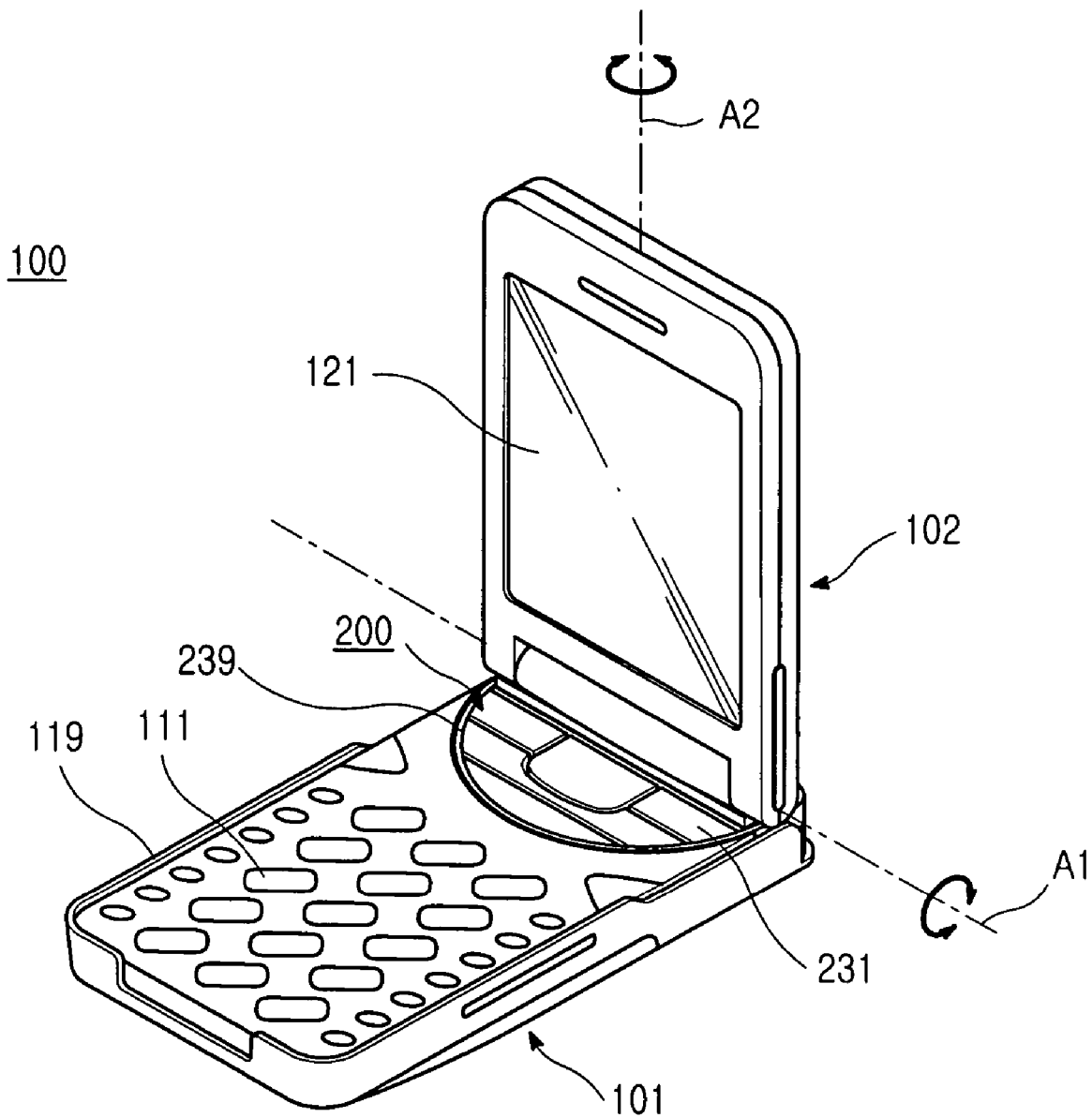
FIG. 3 is a perspective view of the portable terminal shown in FIG. 1 wherein its second housing is rotated 90° and opened.
Figure 4:
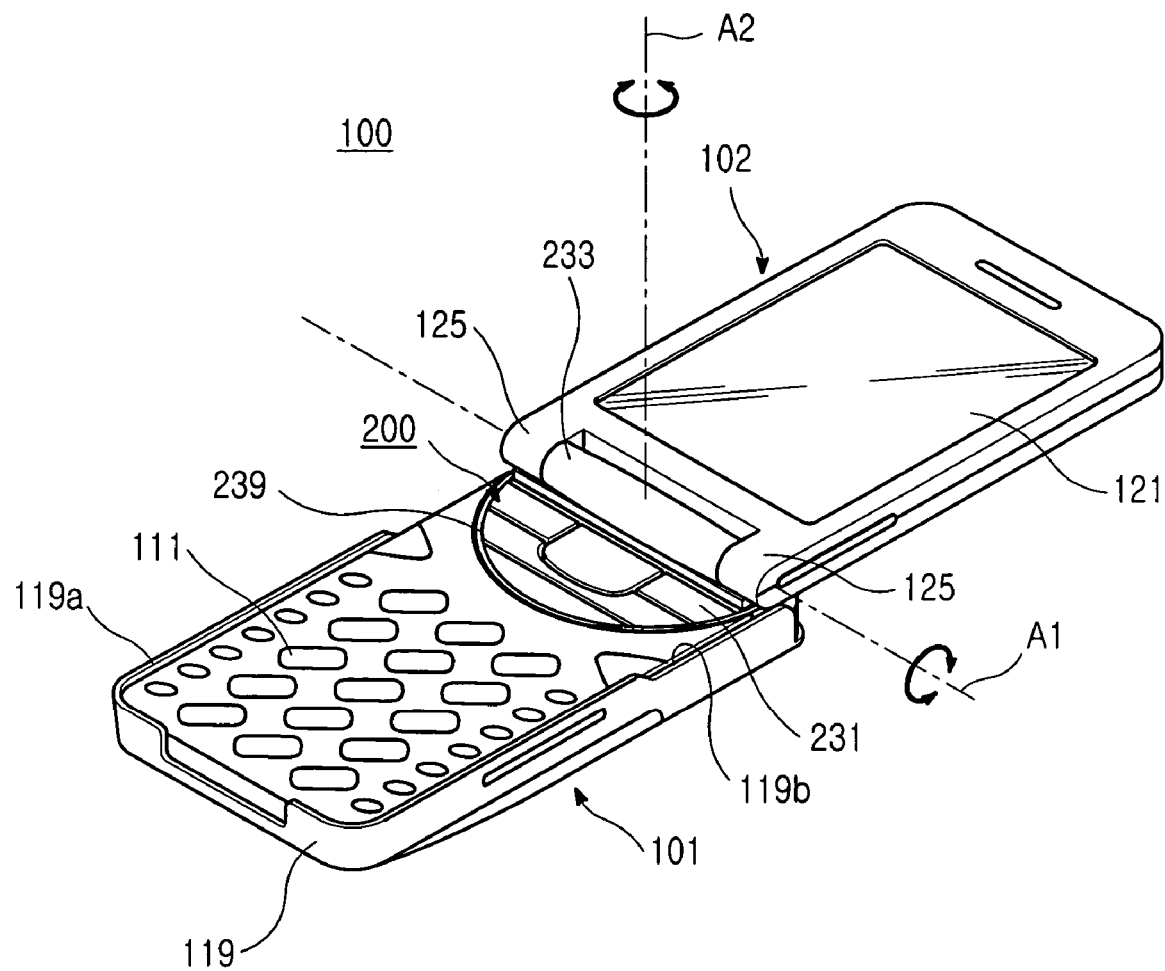
FIG. 4 is a perspective view of the portable terminal shown in FIG. 1 wherein its second housing is rotated about 180° and opened.
Figure 5:
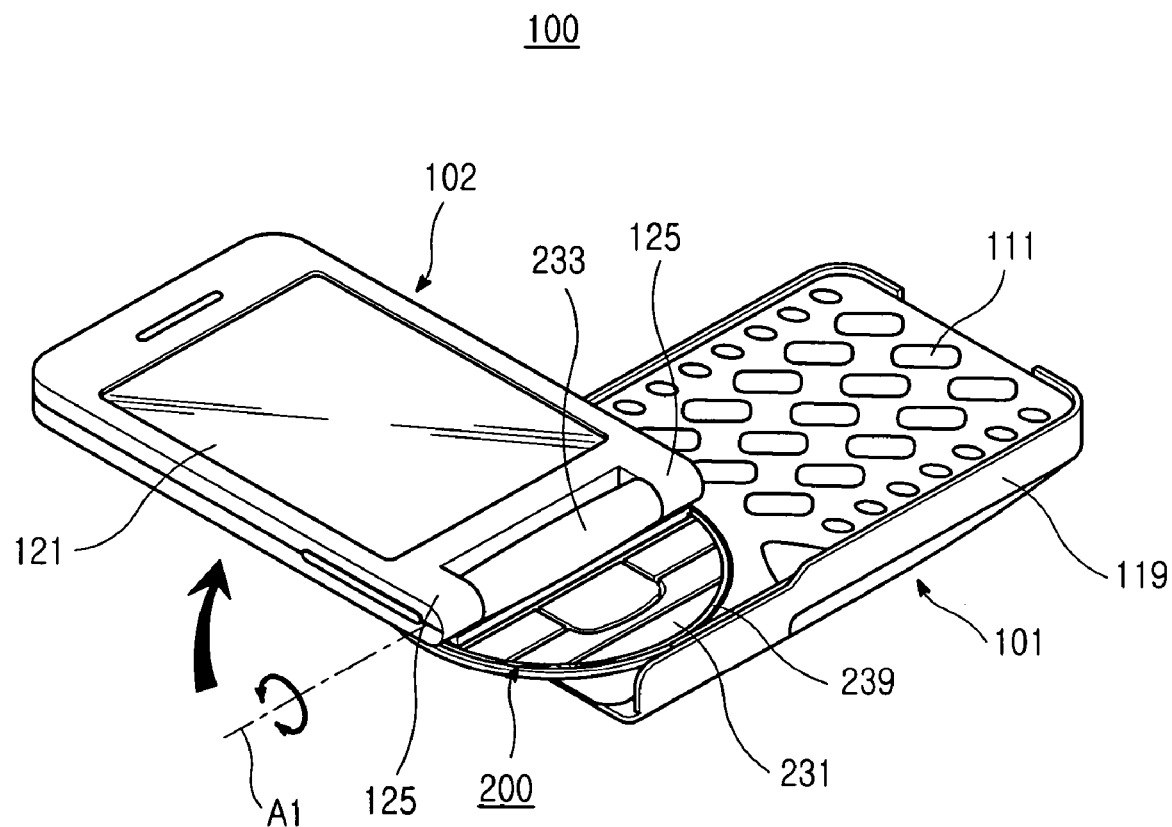
FIG. 5 is a perspective view of the portable terminal shown in FIG. 1 wherein its second housing is being rotated about a rotation axis, and is shown in a position of rotation about 90° from the position shown in FIG. 4.

The second housing 102 is coupled to the first housing 101 via the swing hinge module 200. The second housing 102 can be rotated about the rotation axis A2, which is provided by the swing hinge module 200, while facing the first housing 101, as shown in FIGS. 3 and 5. The second housing 102 can also be pivoted about the hinge axis A1, which is provided by the swing hinge module 200, in a direction towards or away from the first housing 101, as shown in FIG. 3 or 4.

Figure 6:
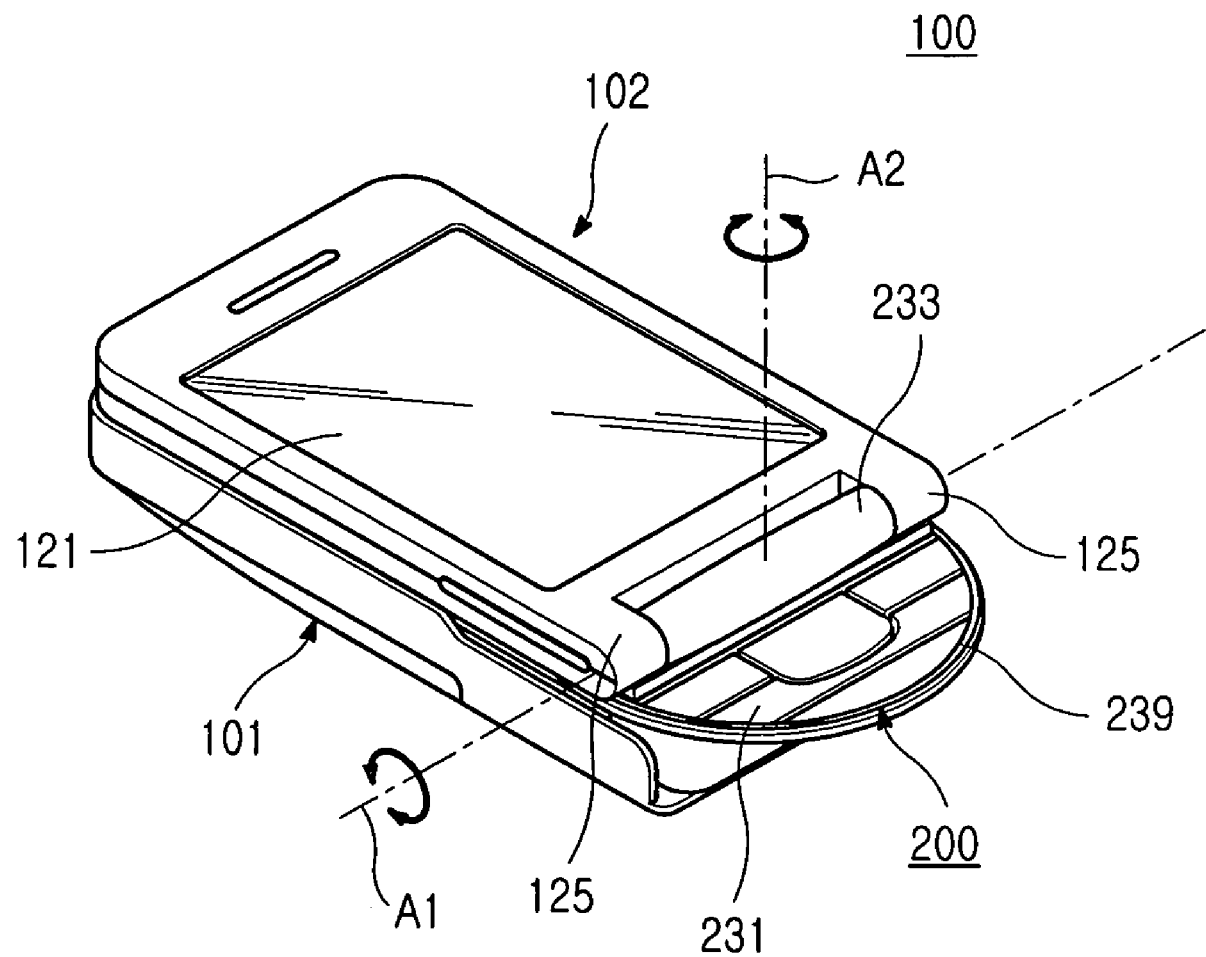
FIG. 6 is a perspective view of the portable terminal shown in FIG. 1 wherein its second housing has been rotated about 180° from the position shown in FIG. 4, and is in a reversed upside down position from the position shown in FIG. 1.

The swing hinge module 200 has an upper surface which faces the second housing 102 and preferably has a semi-cylindrical shape. Key buttons 231 may be provided on the upper surface of the swing hinge module 200. The key buttons 231 play the role of function keys for calling up menus, searching for stored data, and the like for the portable terminal 100. When the second housing 102 is opened away from the first housing 101, the key buttons 231 are exposed near the key pad 111. On the other hand, when the second housing 102 is reversed upside down and folded onto the first housing 101, the key buttons 231 are rotated away from the first housing 101 and protrude from an end of the portable terminal 100, as shown in FIG. 6. It is possible in this position to operate the key buttons 231. In summary, if the second housing 102 is rotated about the rotation axis A2, the key buttons 231 are rotated about the rotation axis A2 with the swing hinge module 200.

Figure 7:
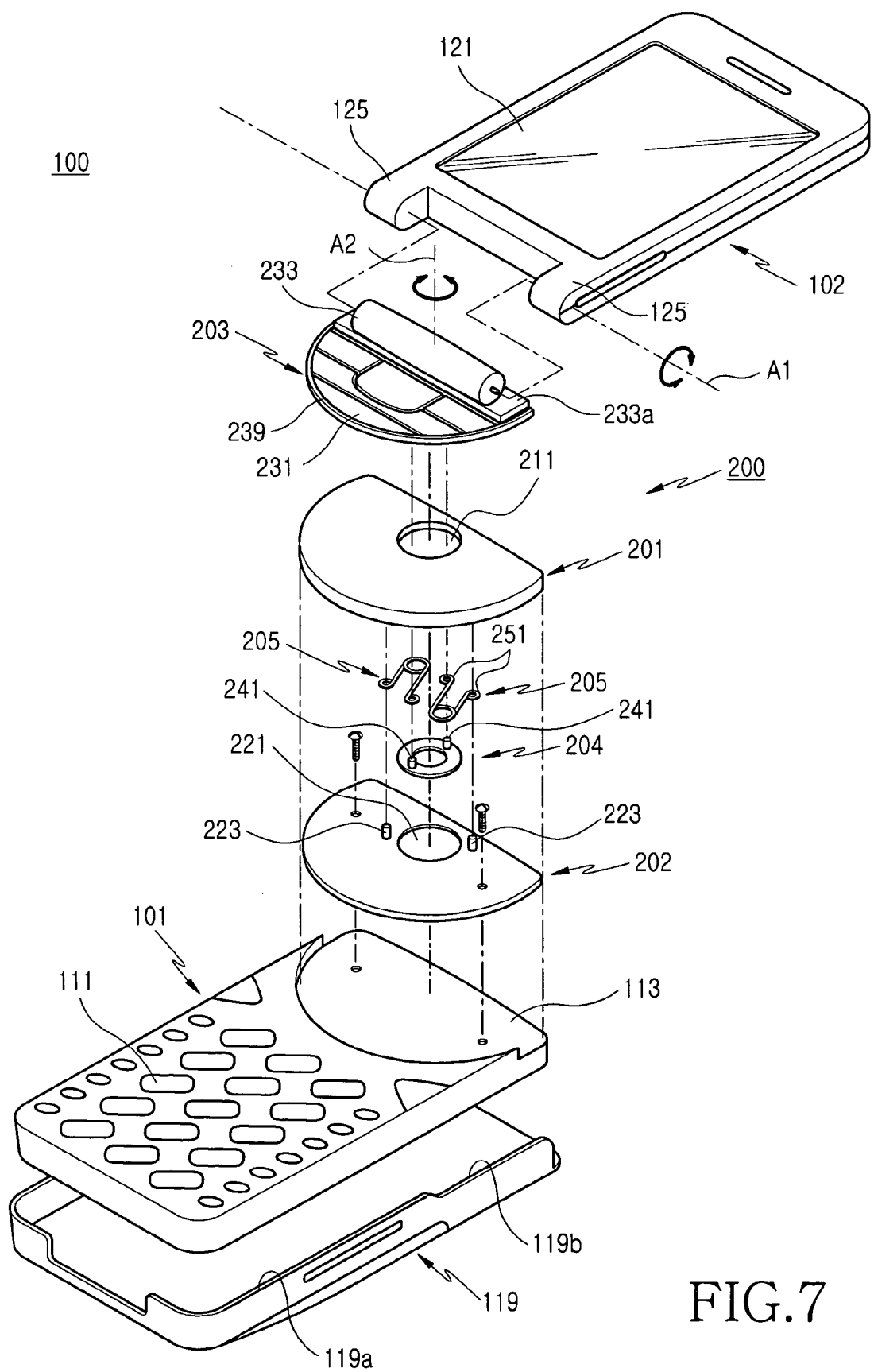
FIG. 7 is an exploded perspective view of the portable terminal shown in FIG. 4.
Figure 8:
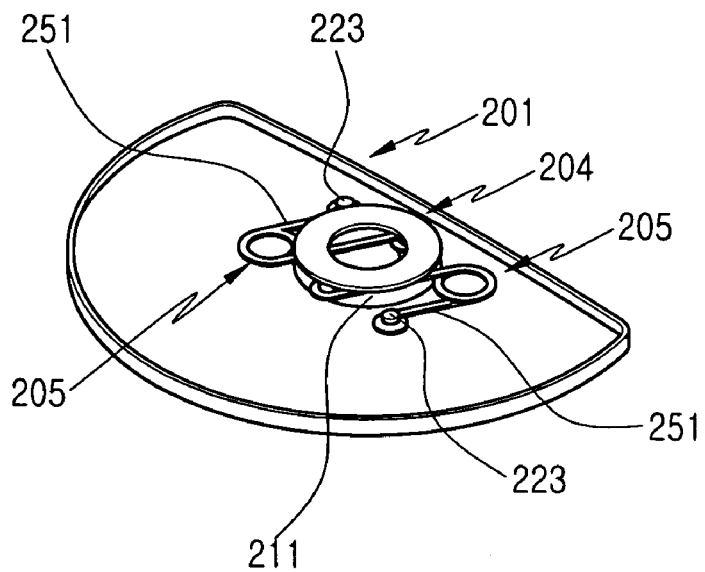
FIG. 8 is a perspective view of some components of a swing hinge module shown in FIG. 7.
Figure 9:
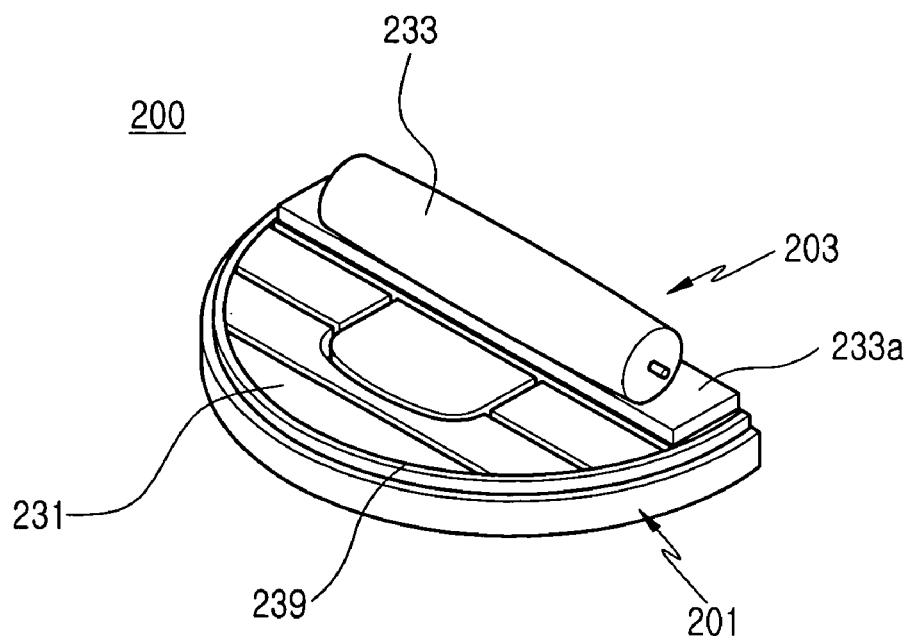
FIG. 9 is a perspective view of the assembled swing hinge module shown in FIG. 7.

Referring to FIGS. 7 to 9, the swing hinge module 200 has a spring housing 201, a housing cover 202, a swing plate 203, a swing coupler 204 and torsion springs 205.

With housing cover 202 attached beneath its bottom surface, the spring housing 201 is fastened on the upper region of the top surface of the first housing 101. Coupling grooves or recess 113, having a shape corresponding to that of the spring housing 201, may be formed on the upper region of the top surface of the first housing 101 for coupling of the spring housing 201. The spring housing 201 has a through-hole 211 extending along the rotation axis A2. A pair of first supporting protrusions 223 extend in parallel with the rotation axis A2 near the through-hole 211 within the spring housing 201. Although the first supporting protrusions 223 are shown to be formed on the housing cover 202, it will be obvious to those skilled in the art that they may be formed on the inner surface of the spring housing 201. The first supporting protrusions 223 are positioned symmetrically about the rotation axis A2. A rotation groove or recess 221 is formed on the inner surface of the housing cover 202 between the pair of the first supporting protrusions 223. Recess 221 may also comprise a through-hole.

Swing coupler 204 has the shape of a washer with a predetermined diameter and is adapted to be rotated within the rotation groove or recess 221. A pair of second supporting protrusions 241 extend in parallel with the rotation axis A2 on a surface of the swing coupler 204. The second supporting protrusions 241 protrude out of the spring housing 201 via the through-hole 211.

Torsion springs 205 have a pair of free ends 251, each of which is supported on the first and second supporting protrusions 223 and 241, respectively, for generating rotational force. According to a rotation angle of the swing plate 203, the rotational force of the torsion springs 205 causes the swing plate 203 to be rotated to its initial pre-rotation position or to a predetermined angular position. The rotational force generated by the torsion springs 205 is transmitted to the swing plate 203 via the swing coupler 204. The torsion springs 205 are preferably positioned symmetrically about the rotation axis A2 for constant rotational force.

The swing plate 203 is supported on the second supporting protrusions 241, which protrude out of the spring housing 201, and is adapted to be rotated about the rotation axis A2 with respect spring housing 201 while facing the spring housing 201. The swing plate 203 is provided with, on its surface, the key buttons 231 and a center hinge arm 233 extending perpendicularly to the rotation axis A2. Since the swing plate 203 is adapted to be rotated while facing the top surface of the first housing 101, specifically the spring housing 201, it may be provided with a metallic case 239 on its bottom and outer peripheral surfaces to guarantee endurance.

The second housing 102 is provided with, on each of its opposite sides, side hinge arms 125 which are adapted to be coupled to opposite ends of the center hinge arm 233. The center hinge arm 233 and the side hinge arms 125 are rotatably coupled to each other and thus provide the hinge axis A1. The center hinge arm 233 is provided with a hinge module (not shown) for providing the hinge axis A1. The hinge module may provide rotational force which allows the second housing 102 move towards or away from the first housing 101 according to the extent to which the second housing 102 is rotated and opened. Such a hinge module can be variously configured, such as hinge modules disclosed in U.S. Pat. No. 6,292,980 (the contents of which are hereby incorporated by reference) issued to the present assignee on Sep. 25, 2001. Since the second housing 102 is adapted to be rotated about the rotation axis A2 while facing the first housing 101, its surface may be damaged during rotation due to, for example, a scratch caused by friction. To prevent this, the center hinge arm 233 may be positioned on a protruding area 233a which protrudes a predetermined distance from the top surface of the swing plate 203. This keeps the second housing 102 spaced a predetermined distance even when it is folded on the first housing 101 and thus avoids any damage caused by scratching and the like.

Figure 10:
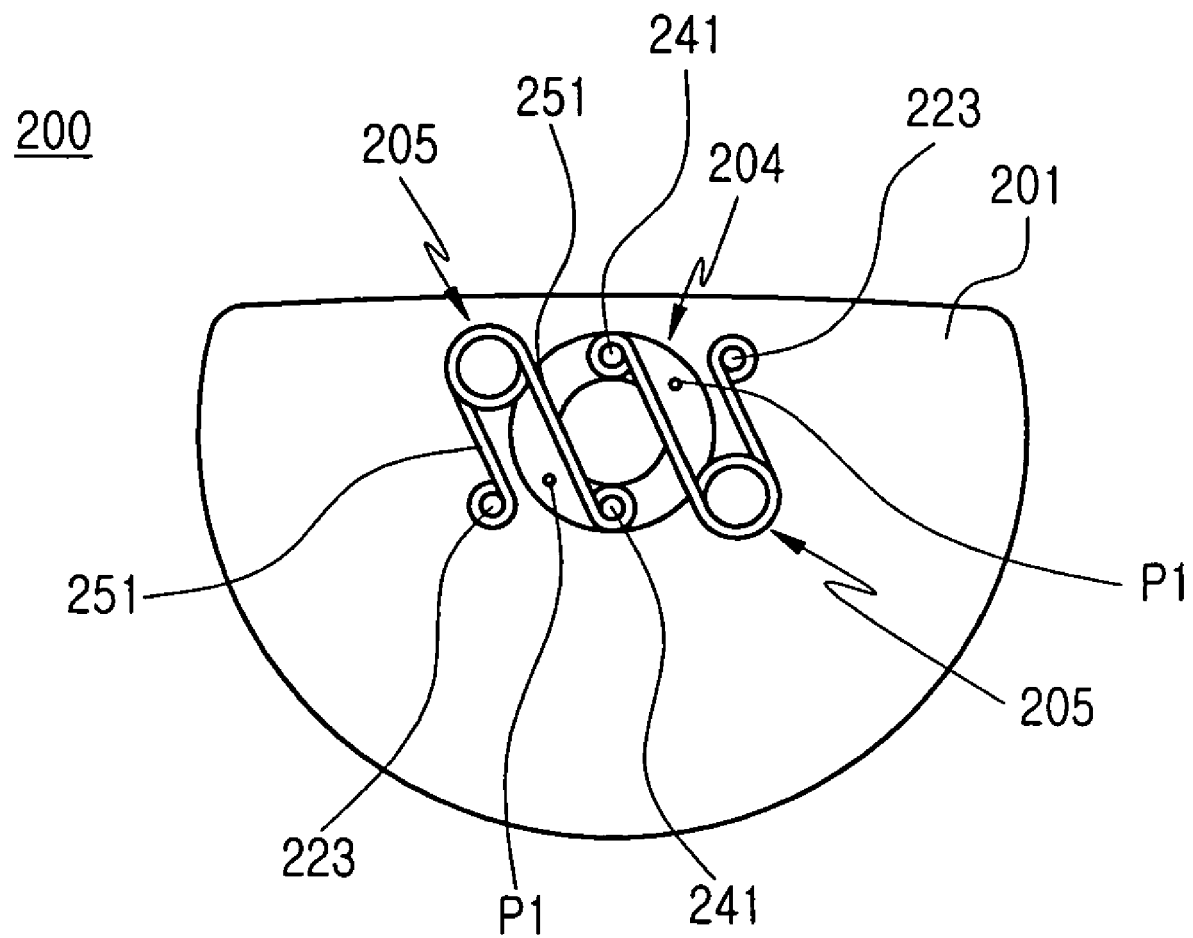
FIG. 10 is a top view illustrating a construction of the swing hinge module shown in FIG. 8.

The operation of the swing hinge module 200, as configured above, will now be described with reference to FIG. 10. If the swing plate 203 begins rotating clockwise together with the swing coupler 204 from an initial state, in which the torsion springs 205 have not accumulated elastic force, the second supporting protrusions 241 approach the first supporting protrusions 223. The torsion springs 205 accumulate elastic force as the second supporting protrusions 241 approach the first supporting protrusions 223 and the accumulated elastic force is maximized when the second supporting protrusions 241 are in positions P1 closest to the first supporting protrusions 223. Then, the elastic force accumulated in the torsion springs 205 directs the second supporting protrusions 241 away from the first supporting protrusions 223. If the swing plate 203 is further rotated clockwise even when the accumulated elastic force is maximized, the elastic force causes the swing plate 203 to be rotated to a predetermined angular position. In other words, if a user rotates the swing plate 203 until the second supporting protrusions 241 are rotated beyond the positions P1 closest to the first supporting protrusions 223, the swing plate 203 is rotated to a predetermined position and stopped under the application of the elastic force accumulated in the torsion springs 205. The position where the swing plate 203 is supposed to be stopped depends on the distance between the free ends 251 of the torsion springs 205, and the longer the distance is, the larger the range of rotation of the swing plate 203. On the other hand, if the second supporting protrusions 241 are rotated within the positions P1 closest to the first supporting protrusions 223, the elastic force accumulated in the torsion springs 205 causes the swing plate 203 to return to its initial pre-rotation position.

When a user rotates the second housing 102 using the operation of the swing hinge module 200, as mentioned above, the elastic force accumulated in the torsion springs 205 rotates the second housing 102 to its initial pre-rotation position or to a predetermined position. This depends on whether or not the second supporting protrusions 241 have moved beyond the positions P1 closest to the first supporting protrusions 223, due to the rotation of the second housing 102. Since the second housing 102 may also be rotated to a position in which it is reversed upside down and is folded on the first housing 101 (FIG. 6), the swing plate 203 may be adapted to be rotated up to 180° and stopped. Furthermore, the range of rotation of the torsion springs 205 may be extended to more than 180° in accordance with the distance between the free ends 251 of the torsion springs 205.

Figure 11:
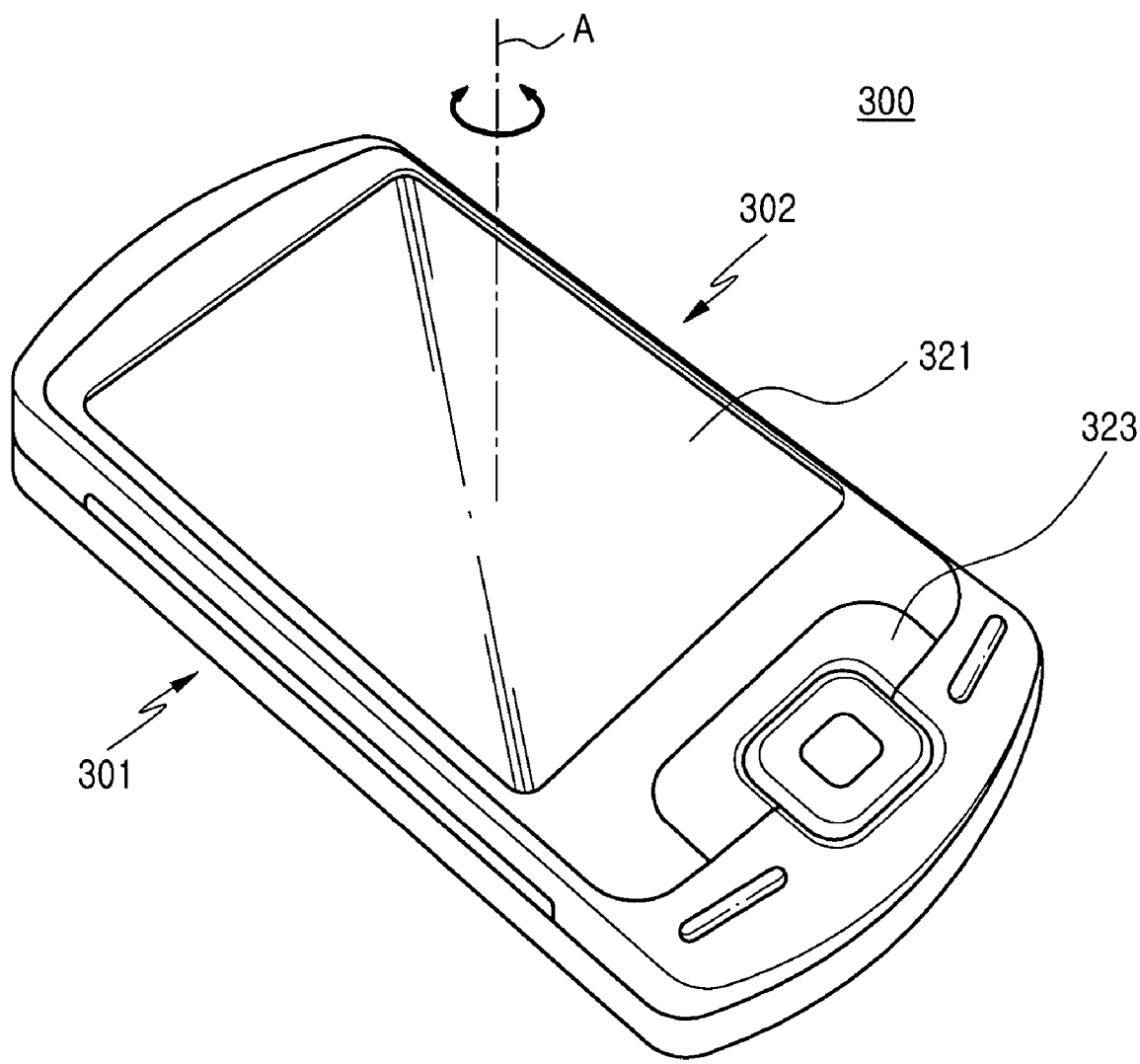
FIG. 11 is a perspective view showing a portable terminal according to a second embodiment of the present invention.
Figure 12:
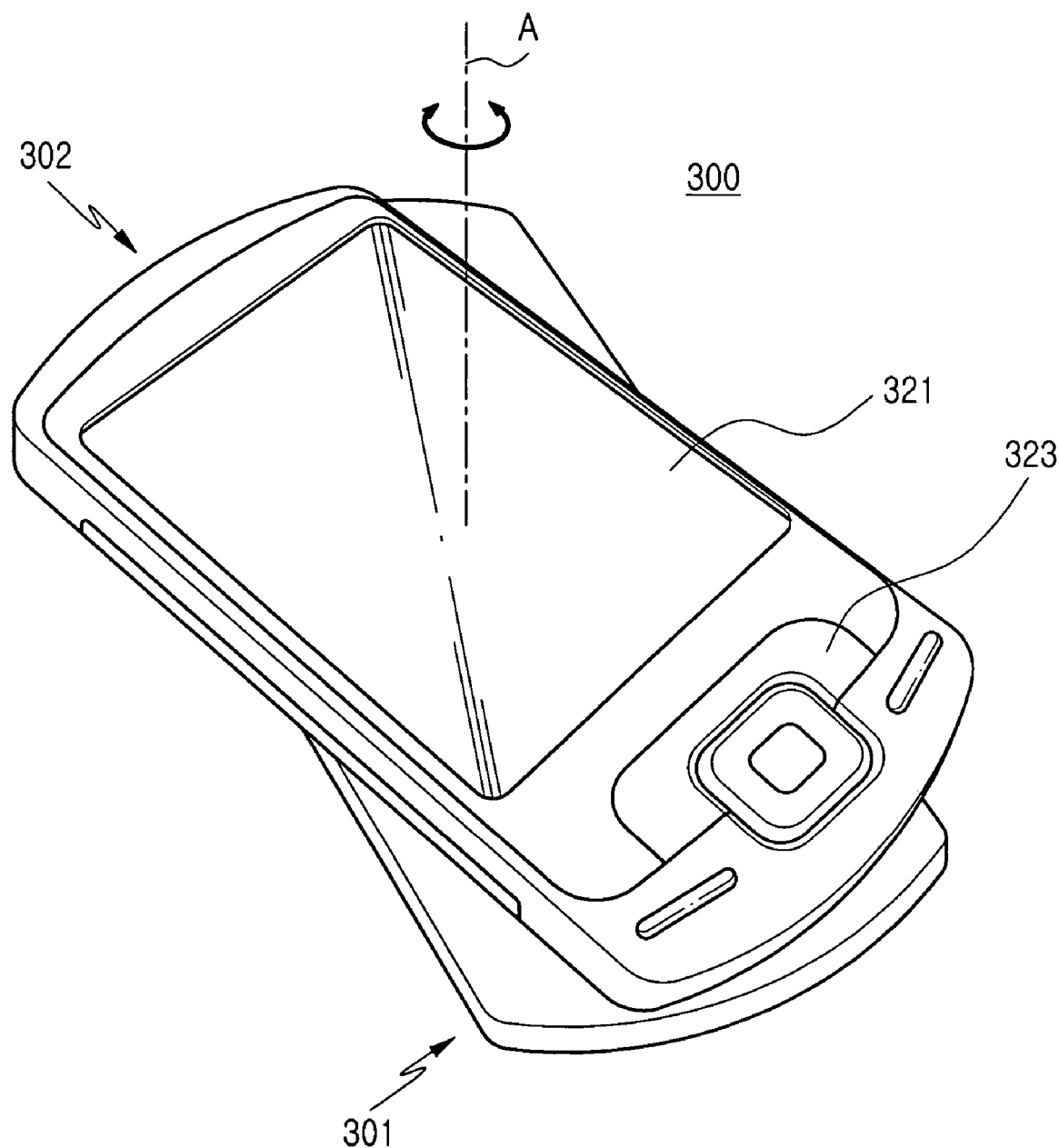
FIG. 12 is a perspective view of the portable terminal shown in FIG. 11 wherein its second housing is being rotated.
Figure 13:
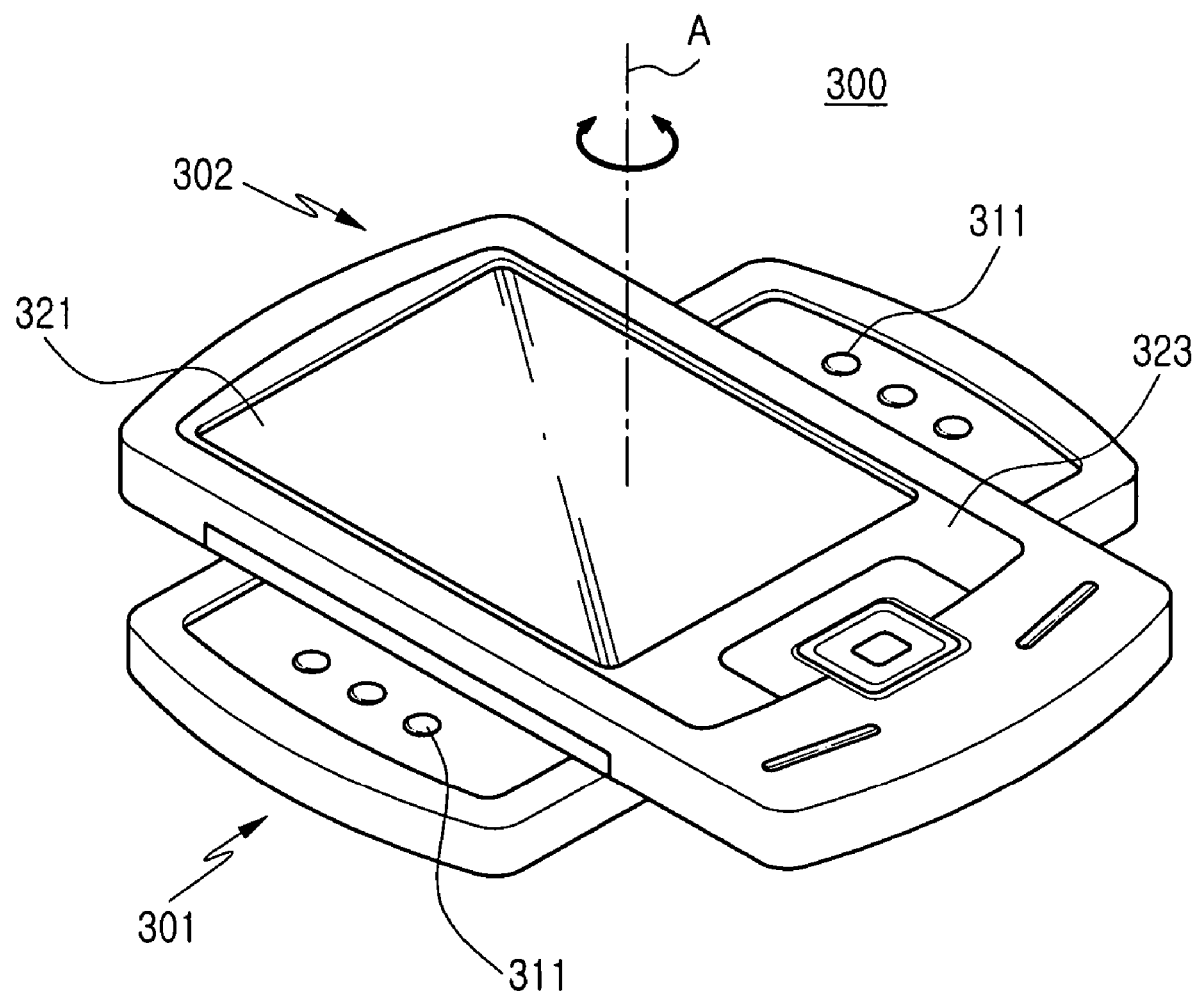
FIG. 13 is a perspective view of the portable terminal shown in FIG. 11 wherein its second housing is rotated 90°.

FIGS. 11 to 13 are perspective views showing portable terminal 300 according to a second embodiment of the present invention. As shown in FIGS. 11 to 13, the portable terminal 300 according to a second embodiment of the present invention comprises a first housing 301 and a second housing 302.

The first housing 301 is provided with key pads 311 on each of opposite ends of its top surface and the second housing 302 is provided with a display unit 321 and key buttons 323 on its top surface. Although not shown in the drawings, the portable terminal 300 may be provided with a transmitter unit and a receiver unit.

The first and second housings 301 and 302 are coupled to each other while facing each other. The second housing 302 is adapted to be rotated on the first housing 301 about a rotation axis A extending perpendicularly to the top surface of the first housing 301. The first and second housings 301 and 302 have a bar shape extending along their respective longitudinal directions. If the second housing 302 is rotated 90° relative to the first housing 301, the key pads 311, which are provided on each of opposite ends of the top surface of the first housing 301, are exposed. Then, a user can easily input and search data using the key pads 311, as well as conveniently use various programs, such as chatting, games, and the like.

Figure 14:
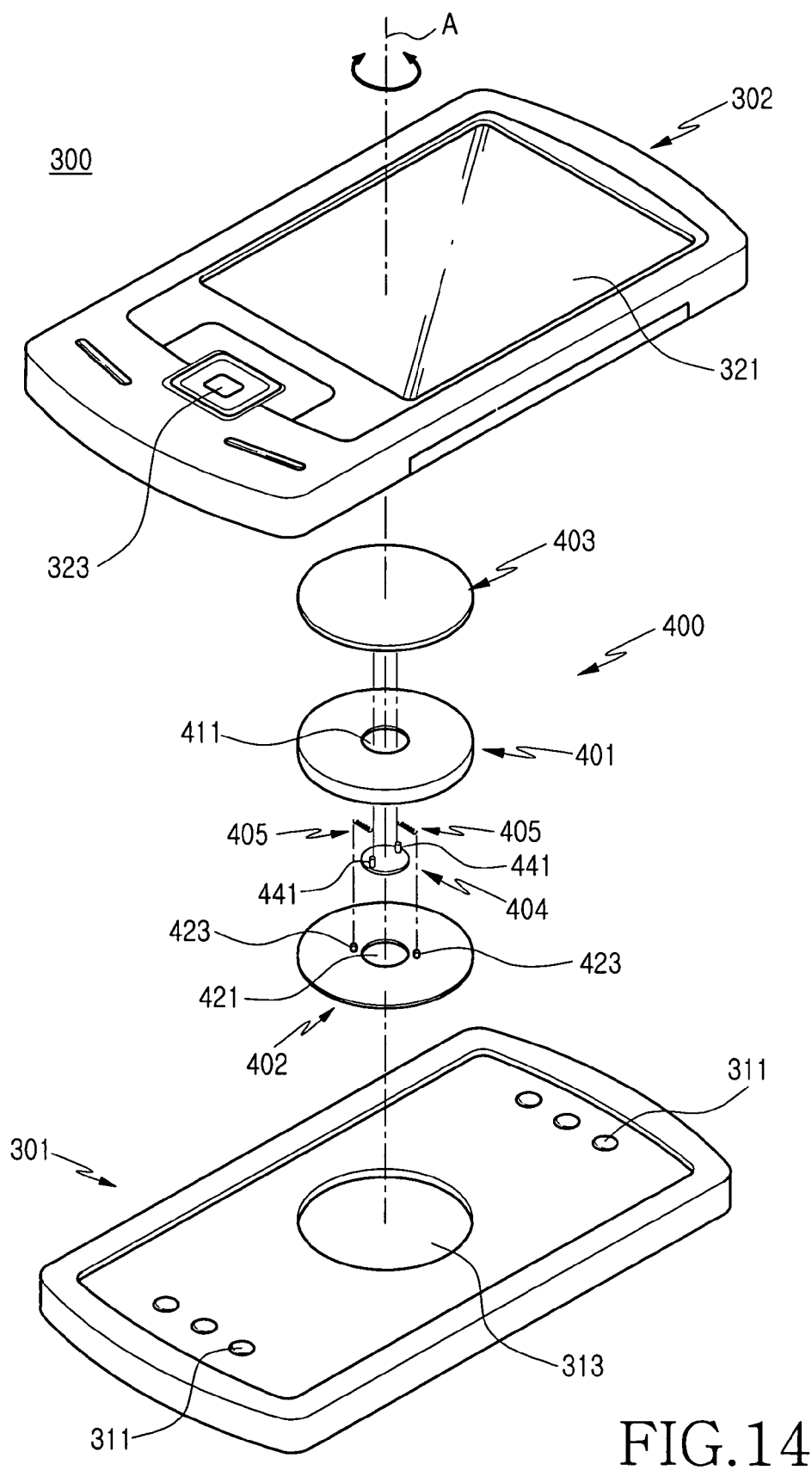
FIG. 14 is an exploded perspective view of the portable terminal shown in FIG. 11.

Referring to FIG. 14, the first and second housings 301 and 302 are rotatably coupled while facing each other by means of a swing hinge module 400. The swing hinge module 400 comprises a spring housing 401, a housing cover 402, a swing plate 403, a swing coupler 404, and compression springs 405.

Housing cover 402 is attached to the bottom surface of the spring housing 401. Spring housing 401 is provided with a through-hole 411, while housing cover 402 is provided with a rotation groove 421 and first supporting protrusions 423 as in the former embodiment. The spring housing 401 is fastened on the center portion of the first housing 301. A coupling groove or recess 313, having a shape corresponding to that of the spring housing 401, may be formed on the center portion of the first housing 301.

The swing coupler 404 has a shape of a washer with a predetermined diameter and is provided with, on its surface, a pair of second supporting protrusions 441 extending in parallel with the rotation axis A. The second supporting protrusions 441 protrude out of the spring housing 401 via the through-hole 411. The swing coupler 404 is adapted to be rotated about the rotation axis A within the rotation groove 421.

The swing plate 403 is fastened on the second supporting protrusions 441, which protrude via the through-hole 411, and at the same time to the bottom surface of the second housing 302. As the swing plate 403 is fastened on the second supporting protrusions 441, any rotation of the swing coupler 404 is accompanied by the rotation of the swing plate 403 about the rotation axis A.

The compression springs 405 have a pair of ends, each of which is supported on the first and second supporting protrusions 423 and 441, respectively. According to a rotation angle of the swing plate 403, the compression springs 405 cause the swing plate 403 to be rotated to or from its initial pre-rotation position or to a predetermined angular position. The rotational force generated by the compression springs 405 is transmitted to the swing plate 403 via the swing coupler 404, which is provided with the second supporting protrusions 441. The compression springs 405 are preferably positioned symmetrically about the rotation axis A for constant rotational force.

Figure 15:
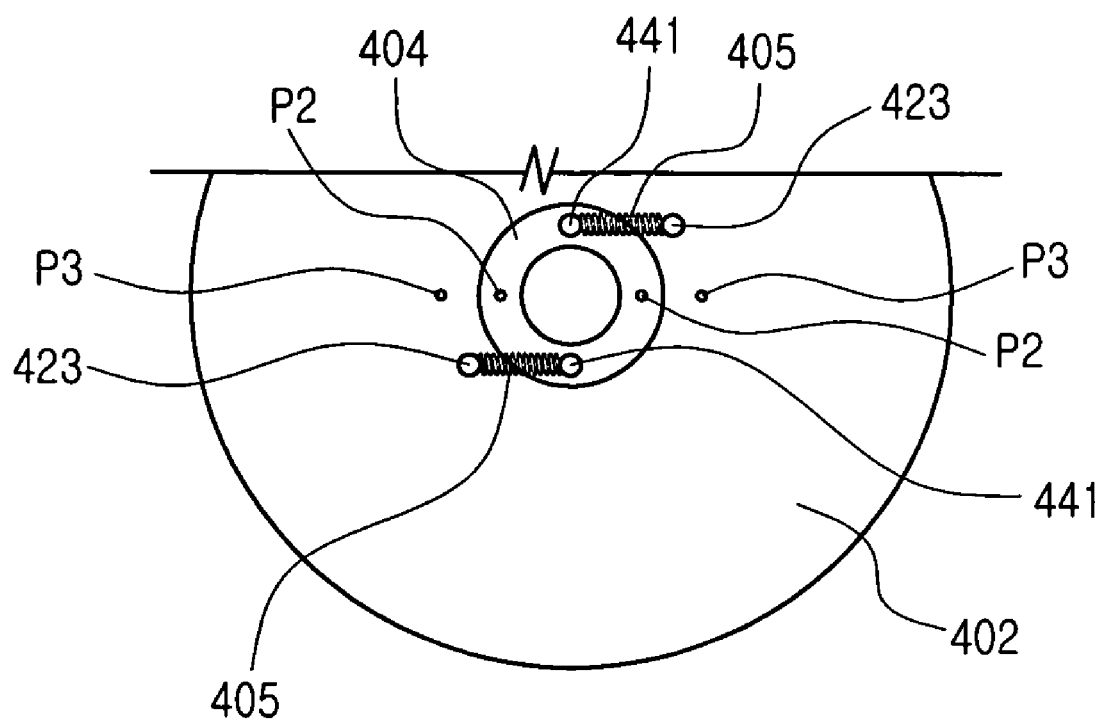
FIG. 15 is a top view illustrating a construction of a swing hinge module shown in FIG. 14.

The operation of the swing hinge module 400, as configured above, will now be described with reference to FIG. 15. If the swing plate 403 begins rotating clockwise together with the swing coupler 404 from an initial state, in which the compression springs 405 have not accumulated elastic force, the second supporting protrusions 441 approach the first supporting protrusions 423. The compression springs 405 come to accumulate elastic force as the second supporting protrusions 441 approach the first supporting protrusions 423 and the accumulated elastic force is maximized when the second supporting protrusions 441 are in positions closest to the first supporting protrusions 423. Then, the elastic force accumulated in the compression springs 405 directs the second supporting protrusions 441 away from the first supporting protrusions 423. If the swing plate 403 is further rotated clockwise even when the elastic force accumulated in the compression springs 405 is maximized, the elastic force of the compression springs 405 causes the swing plate 403 to be rotated to a predetermined position P2. In other words, if a user rotates the swing plate 403 until the second supporting protrusions 441 are rotated beyond the positions closest to the first supporting protrusions 423, the swing plate 403 is rotated to a predetermined position P2 and stopped under the application of the elastic force accumulated in the compression springs 405. The position P2 where the swing plate 403 is supposed to be stopped depends on the length of the compression springs 405 and the larger the length is, the larger the range of rotation of the swing plate 403. The swing hinge module 400 shown in FIG. 15 is adapted to rotate the second housing 302 about 90°.

On the other hand, if the first supporting protrusions 423 are formed in positions P3 farther from the second supporting protrusions 441 and the length of the compression springs 405 corresponds to the distance between the first and second supporting protrusions 423 and 441, the swing hinge module 400 can rotate the second housing 302 up to 180°.

In portable terminals having swing hinge modules according to the first and second embodiments of the present invention, the second housing is rotated semi-automatically while facing the first housing. If the swing hinge module is positioned adjacently to an end of the first housing, the second housing can be rotated in a direction towards or away from the first housing.

As mention above, the present invention can satisfy various users' tastes by providing a portable terminal whose second housing can be rotated while facing its first housing. In addition, according to where the swing hinge module is installed, the second housing can be rotated in a direction towards or away from the first housing. This makes it possible to implement various terminal designs. The swing hinge module enables semi-automatic rotation of the second housing and makes the terminals more convenient to use.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A portable terminal comprising:
    a first housing having a top exterior first surface;
    a swing plate coupled to an area of the first housing and rotatable about a rotation axis perpendicular to the top exterior first surface;
    at least one key button provided on a top swing surface of the swing plate; and
    a second housing having a top exterior second surface and a bottom exterior second surface, the second housing coupled to the swing plate and rotatable about a hinge axis which extends perpendicularly to the rotation axis, the second housing being rotatable about the rotation axis together with the swing plate and, at the same time, rotatable about the hinge axis in a direction towards or away from the first housing so that the at least one key button is exposed and protrudes from an end of the portable terminal when the second housing is folded onto the first housing with the top exterior second surface facing the top exterior first surface and the bottom exterior second surface facing outward from the portable terminal, and the at least one key button is covered by the second housing, when the second housing is folded onto the first housing with the bottom exterior second surface facing the top exterior first surface and the top exterior second surface facing outward from the portable terminal.

2. A portable terminal as claimed in claim 1, wherein the first housing is provided with, on the top exterior first surface, a coupling groove having a predetermined shape for receiving the swing plate and a key pad disposed adjacent to the coupling groove.

3. A portable terminal as claimed in claim 2, wherein the coupling groove has a semi-circular shape.

4. A portable terminal as claimed in claim 2, wherein, when the first housing is rotated to an open position about the hinge axis, the swing plate is completely received in the coupling groove.

5. A portable terminal as claimed in claim 1, further comprising a cover over a lower surface, opposite sides, and a bottom surface of the first housing.

6. A portable terminal as claimed in claim 5, wherein the cover is made of a metallic material.

7. A portable terminal as claimed in claim 1, further comprising a case surrounding an outer peripheral surface and bottom surface of the swing plate.

8. A portable terminal as claimed in claim 7, wherein the case is made of a metallic material.

9. A portable terminal as claimed in claim 1, wherein the swing plate has a semi-cylindrical shape.

10. A portable terminal as claimed in claim 1, wherein the second housing is provided with, on at least one of the top exterior second surface and the bottom exterior second surface, a display unit.

11. A portable terminal comprising:
    a first housing;
    a swing hinge module having a protruding area formed on a top swing hinge surface of the swing hinge module, the swing hinge module being positioned in an area of the first housing and providing a rotation axis which extends perpendicularly to a top exterior first surface of the first housing;
    at least one key button provided on the top swing hinge surface;
    a hinge module positioned on the protruding area and providing a hinge axis extending perpendicularly to the rotation axis; and
    a second housing having a top exterior second surface and a bottom exterior second surface, the second housing coupled to the protruding area by means of the hinge module and adapted to be rotated about the hinge axis in a direction towards or away from the first housing, the second housing being rotatable about the rotation axis together with the swing hinge module so that the at least one key button is exposed and protrudes from an end of the portable terminal when the second housing is folded onto the first housing with the top exterior second surface facing the top exterior first surface and the bottom exterior second surface facing outward from the portable terminal, and the at least one key button is covered by the second housing, when the second housing is folded onto the first housing with the bottom exterior second surface facing the top exterior first surface and the top exterior second surface facing outward from the portable terminal.

12. A portable terminal as claimed in claim 11, wherein the second housing is rotatable about the rotation axis provided by the swing hinge module while facing the first housing.

13. A portable terminal as claimed in claim 11, wherein the first housing is provided with, on its top exterior first surface, a coupling groove having a predetermined shape for receiving a swing plate and a key pad disposed adjacent to the coupling groove.

14. A portable terminal as claimed in claim 13, wherein the coupling groove has a semi-circular shape.

15. A portable terminal as claimed in claim 13, wherein, when the swing plate is completely received in the coupling groove of the first housing, the at least one key button is disposed adjacent to the key pad and, when the swing plate is rotated to be completely removed from the coupling groove, the at least one key button is exposed with respect to the the first and second housings.

16. A portable terminal as claimed in claim 13, further comprising a case surrounding an outer peripheral surface and bottom surface of the swing plate.

17. A portable terminal as claimed in claim 16, wherein the case is made of a metallic material.

18. A portable terminal as claimed in claim 13, wherein the swing plate has a semi-cylindrical shape.

19. A portable terminal as claimed in claim 11, further comprising a cover over a lower surface, opposite sides, and a bottom surface of the first housing.

20. A portable terminal as claimed in claim 19, wherein the cover is made of a metallic material.

21. A portable terminal as claimed in claim 11, wherein the second housing is provided with, on at least one of the top exterior second surface and the bottom exterior second surface, a display unit.

22. A portable terminal as claimed in claim 11, wherein the at least one key button has a semi-cylindrical shape.

23. A portable terminal as claimed in claim 11, wherein the swing hinge module further comprises:
a spring housing;
at least one spring having one end supported on the spring housing; and
a swing plate coupled to the spring housing and adapted to be rotated about a rotation axis by an elastic force from the at least one spring while facing the spring housing, wherein the protruding area is formed on a top surface of the swing plate, the at least one key button is provided on a top surface of the swing plate, and
the at least one spring is adapted to provide rotational force which rotates the swing plate between an initial pre-rotation position and a predetermined position in accordance with a rotational angle of the swing plate.

24. A portable terminal as claimed in claim 23, wherein the at least one spring comprises a pair of springs positioned symmetrically about the rotation axis.

25. A portable terminal as claimed in claim 11, wherein the swing hinge module further comprises:
a spring housing fastened on an upper region of the first housing;
at least one spring having one end supported on the spring housing; and
a swing plate coupled to the spring housing and adapted to be rotated about a rotation axis by an elastic force from the at least one spring while facing the spring housing, wherein
the at least one key button is provided on a top surface of the swing plate,
the at least one spring is adapted to provide rotational force which rotates the swing plate between an initial pre-rotation position and a predetermined position in accordance with a rotational angle of the swing plate, and the spring housing has a through-hole formed along the rotation axis and at least one first supporting protrusion extending from its surface along the rotation axis; the at least one spring being a torsion spring having a pair of free ends, one of which is supported on the first supporting protrusion; and the swing plate being provided with at least one second supporting protrusion extending via the through-hole along the rotation axis and supported on the other free end of the torsion spring.

26. A portable terminal as claimed in claim 25, wherein the swing hinge module further comprises a washer adapted to be rotated while facing a surface of the spring housing, and the second supporting protrusion extends from a surface of the washer and is fastened to the swing plate, which is positioned on an other surface of the spring housing, via the through-hole.

27. A portable terminal as claimed in claim 25, wherein a range of rotation of the swing plate is determined by the spacing between the free ends of the torsion spring.

28. A portable terminal as claimed in claim 11, wherein the swing hinge module further comprises:
a spring housing fastened on an upper region of the first housing;
at least one spring having one end supported on the spring housing; and
a swing plate coupled to the spring housing and adapted to be rotated about a rotation axis by an elastic force from the at least one spring while facing the spring housing,
wherein the at least one spring is adapted to provide the elastic force to rotate the swing plate between an initial pre-rotation position and a predetermined position in accordance with a rotational angle of the swing plate, when the swing plate is rotated by a user from the initial pre-rotation position to just beyond the closest position, the elastic force rotates the swing plate further to the predetermined position, and when the swing plate is rotated by the user only within the initial pre-rotation position and the closest position, the elastic force then returns the swing plate to the initial pre-rotation position.

29. A portable terminal as claimed in claim 28, wherein a range of rotation of the swing plate is determined by the length of the compression spring.

30. A portable terminal as claimed in claim 28, wherein the swing plate is provided with, on its surface, a center hinge arm extending perpendicularly to a rotation axis of the swing plate.

* * * * *